Figure 1:
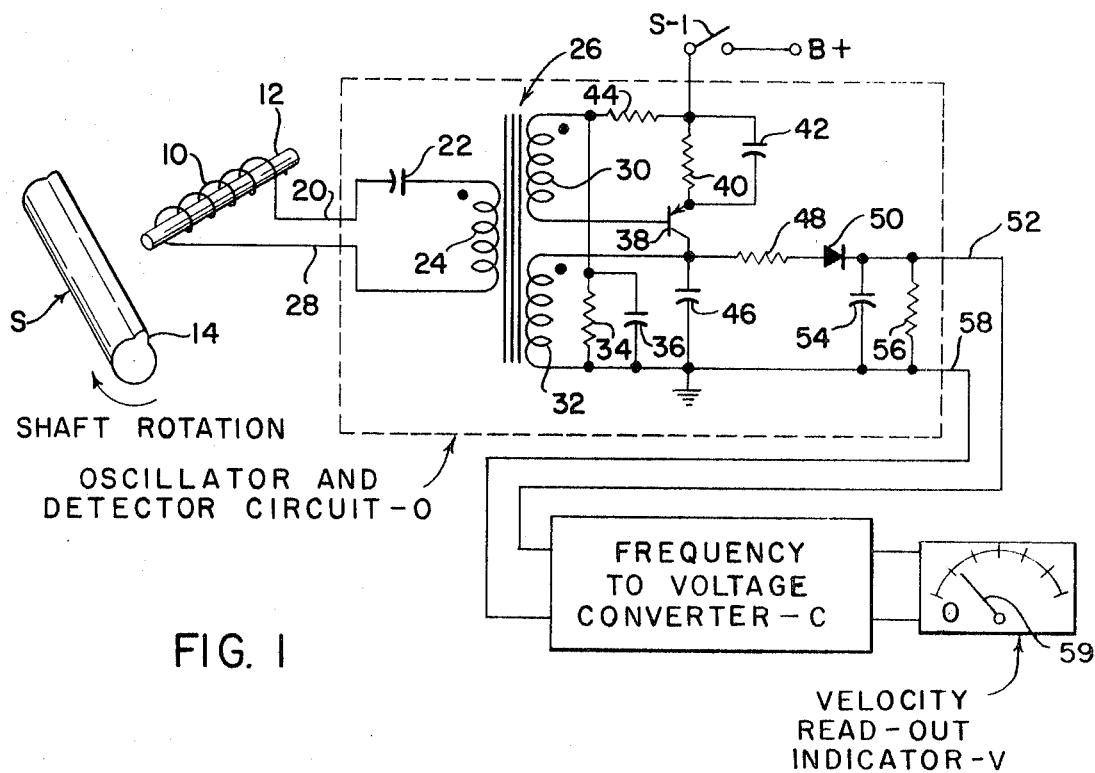

United States Patent

[11] 3,597,687

| [72] | Inventor | William H. Seipp<br>Davenport, Iowa |
|---|---|---|
| [21] | Appl. No. | 835,041 |
| [22] | Filed | June 20, 1969 |
| [45] | Patented | Aug. 3, 1971 |
| [73] | Assignee | Gulf & Western Industries<br>New York, N.Y. |

[54] APPARATUS AND METHOD FOR MEASURING VARIATIONS IN THE ABSORPTION OF ENERGY
2 Claims, 2 Drawing Figs.

[52] U.S. Cl. .................................................. 324/173,
324/34 PS
[51] Int. Cl. ................................................ G01p 3/48
[50] Field of Search........................................... 324/69, 70,
41, 34 PS, 34 D; 331/65; 73/231, 230, 189;
340/38, 195, 196

[56] References Cited
UNITED STATES PATENTS
| 2,325,927 | 8/1943 | Wilbur | 324/70 |
| 2,441,380 | 5/1948 | Zuschlag | 324/34 |
| 3,053,087 | 9/1962 | Waugh | 73/231 |
| 3,233,946 | 2/1966 | Lockhart | 331/65 |
| 3,453,532 | 7/1969 | Gardiner | 324/41 |

*Primary Examiner*—Michael J. Lynch
*Attorney*—Meyer, Tilberry and Body

ABSTRACT: There is disclosed an apparatus and method for measuring the variations in the absorption of energy by a metallic object, wherein the apparatus includes a rod of a material which exhibits the characteristic of concentrating a variable magnetic flux, such as for example ferrite, forming a variable airgap with the metallic object, a coil of wire positioned around the rod, for upon energization, transmitting energy to the rod, and oscillator means for applying energy in the form of an oscillating signal to the coil of wire to thereby energize the coil of wire. Also, there is provided detection means for detecting modulations of the oscillating signal resulting from variations in the energy absorption by the metallic object.

PATENTED AUG 3 1971　　　　　　　　　　　　　　3,597,687

INVENTOR.
WILLIAM H. SEIPP

BY
Meyer, Tilberry & Body
ATTORNEYS

APPARATUS AND METHOD FOR MEASURING VARIATIONS IN THE ABSORPTION OF ENERGY

This application pertains to the art of apparatus for measuring variations in the absorption of energy, and more particularly, to apparatus for accurately measuring the amount of absorption of energy by a metallic object.

This invention is particularly applicable to electronic circuitry for measuring the position or velocity of rotation of a camshaft, and will be described with particular reference thereto, although it will be appreciated that the invention has broader applications, and may be employed for measuring the position, direction of movement, velocity, acceleration, etc., of metallic objects of various structural configurations and having various paths of travel.

Apparatus for measuring the velocity of a rotation of a shaft, such as a cam shaft, have heretofore included mechanical or electrical tachometers which are mechanically coupled to the shaft for providing a direct indication of the speed of rotation of the shaft. One of the problems associated with these types of measuring devices is that as the velocity of the shaft exceeds a predetermined speed, the effect of the inertia exhibited by the moving mechanical parts of the measuring devices introduces a factor of error in the measurement. In addition, the effect of wear on the movable parts of the measuring device also introduces an error factor in the measurement.

Apparatus for measuring the speed of rotation of an object of the type to which this invention pertains, have heretofore included a coil of wire positioned around a permanent magnet so that when the ferrous portion of the object moves into proximity with the permanent magnet, a voltage pulse signal is induced into the coil of wire. This induced voltage signal is then applied to an electrical circuit for providing an indication of the speed of rotation of the object. One of the principle problems associated with this type of measuring device is that the camshaft must be of a particular shape, and only objects fabricated of ferrous materials, such as iron, will induce the required voltage pulse into the coil of wire.

Another apparatus for measuring the position of an object of the type to which this invention pertains, have heretofore included a loop detector, which is generally comprised of an oscillator circuit for applying a high frequency reference signal to an inductive coil of wire. When an object, such as an automobile, enters the zone of influence of the coil of wire, the inherent metallic mass of the object causes a decrease in the inductive reactance of the coil of wire to thereby vary the frequency of oscillation of the oscillator circuit. The variation in the frequency of oscillation is then detected by a detection circuit to thereby provide an indication of the presence of the object. This type of measuring device is particularly appropriate for determining the presence of an object having a large metallic mass, such as an automobile; however, slight changes in the position of the object, such as rotation of the object about an axis, are not readily detected by such a detection system. Thus, while loop-type detectors may be employed to sense the presence of a metallic object, these systems will generally fail to detect minor changes in the position of the object.

The present invention contemplates a new and improved apparatus for detecting the absorption of energy by a metallic object to thereby provide measurement of the position, direction of movement, velocity, acceleration, etc., of metallic objects of various configurations and having various paths of travel, and overcomes all of the above-referred-to problems and others, and provides a measuring apparatus which is simple in construction and extremely accurate in operation.

In accordance with the present invention, there is provided a measuring device for measuring the absorption of energy by a metallic object, wherein the measuring device includes oscillator means for generating energy in the form of an oscillating signal; rod means positioned in proximity to the metallic object for concentrating a variable magnetic flux; conductor means coupled to said oscillator means and positioned around the variable flux concentrating means, for upon energization by the oscillating signal, transmitting energy to said rod means to thereby induce a variable magnetic flux within said rod means; and, detection means having an input circuit means coupled to the oscillator means for providing an output signal having a value representative of the value of the oscillating signal developed by the oscillator wherein the oscillating signal is responsive to the absorption of energy by a said metallic object so that the value of the output signal provides an indication of the amount of energy absorbed by a said metallic object.

In accordance with a more limited aspect of the present invention, the rod means is a cylindrical rod of a material which exhibits the characteristic of concentrating a variable magnetic flux and the conductor means is a coil of wire positioned around the rod, so that when the coil of wire is energized by the oscillating signal, energy is induced into the rod.

In accordance with a still more limited aspect of the present invention, the rod is of a nonpermanent magnet material, such as ferrite.

In accordance with a more limited aspect of the present invention, the detection means is coupled to a visual readout indicator for providing a direct visual indication of the value of the frequency of oscillation of the oscillating signal.

In accordance with another aspect of the present invention the measuring device includes converter means for providing an output signal representative of the frequency of modulation of the oscillating signal wherein the modulations of the oscillating signal are produced by variations in the absorption of energy from the rod means by the metallic object upon rotation of the metallic object about an axis to thereby provide a measuring device for measuring the velocity of rotation of the metallic object.

In accordance with another aspect of the present invention, there is provided a method of measuring the amount of energy absorption by a metallic object, utilizing a variable flux concentrating means positioned in proximity to the metallic object, a coil of wire positioned around the flux-concentrating means, oscillator means coupled to the coil of wire and detection means coupled to the oscillating means. In accordance with the method, the steps for preforming the method include developing energy in the form of an oscillating signal with the oscillator means; applying the energy through the coil of wire to the flux concentrating means; absorbing a portion of the energy applied to the flux-concentrating means with the metallic object, modulating the oscillating signal in response to the absorption of energy by the metallic object; and, electrically measuring the modulations of the oscillating signal with the detection means to thereby provide an indication of the amount of energy absorbed by the metallic object.

The principal object of the present invention is to provide a measuring device for measuring the absorption of energy by a metallic object.

Another object of the present invention is to provide a measuring device for accurately measuring the position, direction of movement, velocity, acceleration, etc., of a metallic object, such as a rotating camshaft.

Another object of the present invention is to provide a measuring device for measuring the position and velocity of movement of a metallic object, which does not require a mechanical connection between the measuring device and the metallic object, so as to thereby eliminate coupling and frictional errors.

A further object of the present invention is to provide a measuring device for measuring the position and velocity of rotation of a rotating metallic object wherein the life expectancy and accuracy of the measuring device is independent of the speed, vibrations, operating time, etc., of the rotating metallic object.

A still further object of the present invention is to provide a measuring device having an output signal which may be coupled to various external circuits to thereby selectively provide a direct readout of the position, direction of movement, velocity, acceleration, etc., of a metallic object.

Figure 2:
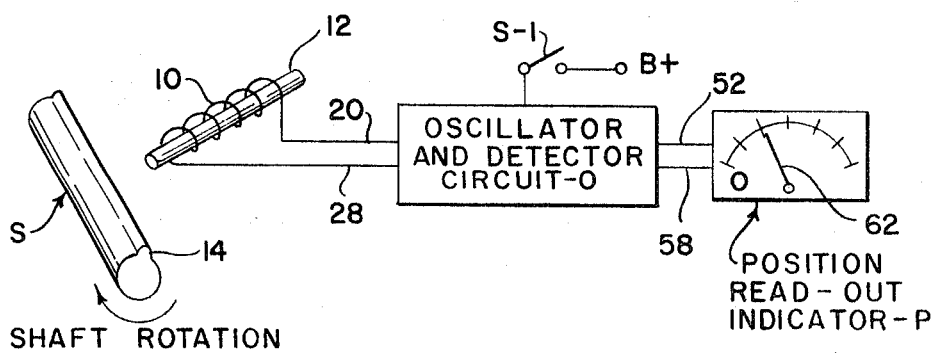

The foregoing objects and other advantages of the invention will become more readily apparent from the following description of the preferred embodiments as illustrated in the accompanying drawings wherein:

FIG. 1 is a combination schematic diagram, block diagram, illustration of the preferred embodiment of the present invention employed to measure the velocity of rotation of a camshaft; and, FIG. 2 is a block diagram illustration of a second aspect of the present invention employed to measure the position of a camshaft.

Referring to the drawings wherein the showings are for purposes of illustrating a preferred embodiment of the invention, and not for purposes of limiting same, FIG. 1 illustrates the measuring device, and generally comprises a coil of wire 10 positioned around a rod 12 and coupled to an oscillator and detector circuit 0. The output terminals of oscillator and detector circuit 0 are coupled through a frequency-to-voltage converter circuit C to a velocity readout meter V. For purposes of description, FIG. 1 also illustrates a rotatable camshaft S being located in proximity to the road 12 and including a cammed surface 14 extending along a portion of the shaft whereby the cammed surface and shaft are irregular with respect to the axis of rotation of the camshaft and cammed surface.

OSCILLATOR AND DETECTOR CIRCUIT

The oscillator and detector circuit 0 includes an input terminal 20 connected through a capacitor 22 to the positive-polarity indicated terminal of a secondary winding 24 of a transformer 26. The other terminal, or negative-polarity indicated terminal, of secondary winding 24 provides the other input terminal 28 of oscillator and detector circuit 0. Transformer 26 also includes a feedback winding 30 and a primary winding 32, wherein the positive polarity indicated terminal of feedback winding 30 is connected through a parallel-connected resistor 34 and capacitor 36, to the nagative-polarity indicated terminal of primary winding 32. The other terminal, i.e., the positive-polarity indicated terminal of primary winding 32 is connected to the collector of an PNP transistor 38 having its base connected directly to the other terminal, i.e., the negative-polarity indicated terminal, of feedback winding 30. The emitter of transistor 38 is connected through a parallel-connected resistor 40 and capacitor 42, to a B+ voltage supply source. The B+ voltage supply source is also connected through a resistor 44 to the positive-polarity indicated terminal of feedback winding 30. The positive-polarity indicated terminal of primary winding 32 is connected through a capacitor 46 to the other terminal, i.e., the negative-polarity terminal, of primary winding 32, which is in turn, connected directly to ground.

The detector circuit of oscillator and detector circuit 0 includes a resistor 48 connected between the positive-polarity indicated terminal of primary winding 32 of transformer 26 and the anode of a diode 50, and the cathode of diode 50 provides one of the output terminals 52 of oscillator and detector circuit 0. The cathode of diode 50 is also connected through a parallel-connected capacitor 54 and resistor 56 to ground, which in turn, provides the other output terminal 58 of oscillator and detector circuit 0.

EXTERNAL CIRCUITRY

The input terminals 20 and 28 of oscillator and detector circuit 0 are connected to a coil of wire 10 which is positioned around the ferrite rod 12. Coil 10 preferably takes the form of a plurality of turns of insulated copper wire, uniformly and tightly wound around ferrite rod 12; however, it is contemplated that various other coupling arrangement could be employed. Rod 12 is preferably comprised of a ferrite material, such as any of the several heretofore-known compounds formed, for example, by treating hydrated ferric oxide with an alkali, or by heating ferric oxide in the presence of a metallic oxide. It is contemplated, however, that rod 12 could be constructed of various other materials which exhibit the characteristic of concentrating in a relatively small area a varying magnetic flux. Ferrite rod 12 is preferably cylindrical in shape since a cylindrical coil of wire provides a more efficient transfer of energy between coil 10 and rod 12. Also, ferrite rod 12 is preferably positioned at approximately right angles and in proximity to camshaft S of which the velocity of rotation is to be determined, since rod 12 serves to concentrate the magnetic flux toward cammed surface 14 of shaft S.

The output terminals 52 and 58 of oscillator and detector circuit 0 are connected through a frequency-to-voltage converter circuit C to a velocity readout meter V. Frequency converter circuit C may take the form of various heretofore-known converters and generally provides the function of receiving a train of positive-polarity pulses of a given frequency, and converting these pulses to a direct current signal having a magnitude proportional to the frequency of the train of positive-polarity pulses. Thus, as the frequency of the positive-polarity input pulses increases, the magnitude of the direct-current output signal increases accordingly. This direct-current output signal may then be applied to a meter, such as a direct-current voltmeter having the dial thereof calibrated in terms of velocity, to thereby provide a direct indication of the velocity of rotation.

Reference is now made to FIG. 2, which illustrates the measuring device of the present invention being employed to measure the position of the cam portion or lobe 14 with respect to the ferrite rod 12. More particularly, since the circuit arrangement of FIG. 2 is somewhat similar to the circuit arrangement of FIG. 1, like numerals designate similar elements. In order to measure the position of cam portion 14 with respect to ferrite rod 12, the output terminals 52 and 58 of oscillator and detector circuit 0 are connected directly to a meter P, such as a direct-current voltmeter having the dial calibrated in terms of distance, to thereby provide a direct indication of the position of cam portion 14. Accordingly, as cam portion 14 of camshaft S moves away from ferrite rod 12, the direct-current signal applied to position readout meter P increases in value causing an increased deflection of the dial pointer 62.

OPERATION

Briefly, upon closure of switch S-1, the circuit including transistor 38 and transformer 26 commences generating a source of energy in the form of a high frequency sinusoidal oscillating signal, preferably in the range of 100 to 300 kilohertz, which is in turn applied through the coil of wire 10 to the ferrite rod 12. This oscillating signal, when applied through coil of wire 10 to ferrite rod 12 induces a varying magnetic flux within rod 12. During the rotation of camshaft S about its axis, cam portion 14 periodically moves toward and away from ferrite rod 12. When camshaft S is positioned such that cam portion 14 is generally adjacent to ferrite rod 12, a portion of the energy applied to ferrite rod 12 is absorbed by cam portion 14. As cammed portion 14 is rotated away from ferrite rod 12, the amount of energy absorbed by cam portion 14 decreases. As is readily apparent, a minor portion of the energy applied to ferrite rod 12 is absorbed by the cylindrical portion of camshaft S; however, this portion of the absorbed energy remains substantially constant throughout the rotation of camshaft S about its axis. Thus, the amount of energy absorbed from ferrite rod 12 by camshaft S, assuming shaft S is rotated about its axis, is dependent upon the position of cam portion 14 with respect to ferrite rod 12. Also, when the cammed portion 14 of shaft S is moved toward and away from ferrite rod 12, the varying magnetic filed established by the varying magnetic flux within rod 12 is modulated or altered to thereby modulate the oscillating signal developed by oscillator and detector circuit 0. If camshaft S is rotated at a constant velocity, the variations in absorption of energy from ferrite rod 12 have the effect of modulating the oscillating signal developed by the oscillator and detector circuit 0. This modulated signal is detected and rectified by the circuitry including diode 50 and capacitor 54, and resistor 56, and is then applied in the form of a train of positive-polarity voltage pulses to the frequency-to-voltage converter C. Converter circuit C, upon receipt of this train of voltage pulses, converts the signals into a direct-current output signal having a magnitude which increases in value in response to an increase of the frequency of the train of voltage pulses. Velocity readout meter V may take the form of a conventional direct-current voltmeter having the dial face thereof calibrated to read velocity as opposed to voltage. Thus, assuming the velocity of rotation of camshaft S to be 60 revolutions per minute, a signal comprised of a train of 60 pulses per minute is applied to converter circuit C, which in turn, develops a direct-current signal representative of the 60 cycle per minute input signal. If, however, the velocity of camshaft S is increased to 120 revolutions per minute, the signal applied to converter circuit C will take the form of a train of pulses with a frequency of 120 cycles per minute, which will in turn cause the magnitude of the direct-current signal applied to velocity readout meter V to accordingly increase in value.

Reference in now made to FIG. 1 which illustrates in more detail the circuit configuration of oscillator and detector circuit 0. Upon closure of switch S-1, the B+ voltage supply source is applied to the emitter of transistor 38 thereby forward biasing this transistor into conduction, which in turn causes capacitor 46 to commence charging to some predetermined value. As capacitor 46 commences charging, an increasing voltage signal is applied across primary winding 32 to thereby cause an induced voltage of a polarity indicated with reference to the polarity dot to build up in feedback winding 30. The voltage induced in feedback winding 30 is applied across the emitter-base junction of transistor 38 to thereby cause this transistor to remain forward biased. Once the voltage developed across capacitor 46 attains a maximum value, i.e., a value equal to approximately the B+ supply source, the voltage across capacitor 46 remains constant thereby causing a constant voltage to be applied to primary winding 32. Also, during the time capacitor 46 is charging, a slight charge is developed across capacitor 42, such that the upper terminal of this capacitor becomes slightly positive with respect to the lower terminal. With the constant voltage signal applied to primary winding 32, the induced voltage in feedback winding 30 decreases to approximately zero potential. With an approximately zero voltage drop across feedback winding 30, capacitor 42 tends to cause transistor 38 to become reverse biased, which in turn allows capacitor 46 to commence discharging. As capacitor 46 discharges, the decreasing voltage applied to primary winding 32 induces a voltage across feedback winding 30, which tends to cause transistor 38 to become completely reversed biased. Capacitor 46 continues to discharge approximately zero potential, and at that time the above-described cycle of operation commences another periodic cycle. The charging and discharging of capacitor 46 also induces a generally sinusoidal voltage across secondary winding 24, which is in turn applied to the coil of wire 10. The frequency of the sinusoidal voltage wave form, or oscillating signal, applied to coil 10 is determined by the frequency of oscillation established by the oscillator circuit including transformer 26 and transistor 38. Preferably, this operating frequency is made very high with respect to the velocity of rotation of camshaft S, so that the modulated signals imposed on this operating frequency may be readily detected with the detection circuitry. The oscillating signal developed across capacitor 46 is applied through the detector circuit including diode 50, capacitor 54, and resistor 56 to thereby rectify and filter the signal developed across capacitor 46 so as to provide an output signal comprised of a ripple of modulated component of the signal developed across capacitor 46.

Accordingly, the energy in the form of a sinusoidal wave developed by oscillator and detector circuit 0 is applied through the coil of wire 10 to the ferrite rod 12. As cam surface 14 rotates toward ferrite rod 12, an increasing portion of the energy applied to ferrite rod 12 is absorbed by camshaft S. Conversely, as cam surface 14 rotates away from ferrite rod 12, the amount of energy absorbed by camshaft S is decreased. The absorption of energy by camshaft S, has the effect of "loading" the oscillator circuit to thereby cause the oscillating amplitude to vary. Upon rectification and filtering of this oscillating signal, a signal is developed which is comprised of a train of positive-polarity voltage pulses having a frequency equal to the velocity of rotation of the camshaft S. This train of voltage pulses is applied to frequency-to-voltage converter C, which in turn provides a direct-current output signal having a value representative of the frequency of the voltage pulses. This direct-current signal is then applied to velocity readout meter V.

Reference is not made to FIG. 2 which illustrates the present invention employed as a shaft position indicator. Accordingly, as cam surface 14 is rotated toward ferrite rod 12, the amount of energy absorbed by ferrite rod 12 increases thereby causing the amplitude of the oscillator signal to decrease in value so that the amplitude of the output signal of oscillator circuit 0 decreases in value. This output signal, which takes the form of a varying amplitude voltage, is applied to a meter, such as a voltage meter, having its dial face calibrated in terms of distance. Thus, if the amplitude of oscillation of oscillator circuit 0 is decreased, the deflection of pointer arm 62 is decreased to thereby indicate a decrease in the distance between cam surface 14 and ferrite rod 12. Similarly, if cam surface 14 is rotated away from ferrite rod 12, pointer arm 62 is deflected in an increasing direction thereby indicating an increase in the distance between cam surface 14 and ferrite rod 12.

As is readily apparent, the measuring device of the present invention may be employed for making measurements of various parameters of a metallic object, such as the position of a metallic object with respect to the ferrite rod 12, the linear velocity of an object, the velocity of rotation of an object, the direction of movement of an object with respect to ferrite rod 12, the acceleration of a metallic object, etc. Thus, dependent on the parameter to be measured, suitable circuitry may be coupled to terminals 52 and 58 of oscillator circuit 0 to provide a direct readout of the selected parameter. For example, in addition to the frequency-to-voltage converter C, and velocity indicator V, as illustrated in FIG. 1, oscillator and detector circuit 0 could be coupled to a digital counter and a suitable readout indicator for providing a substantially similar function. In addition, three or more measuring systems, as illustrated in FIG. 2, could be employed to indicate the precise position of a metallic object with respect to three dimensional space. It is also contemplated that the measuring system, as illustrated in FIG. 2, could be employed to measure the contour of a surface by sweeping the ferrite rod 12 across the surface and measuring the distance indicated on the position readout indicator D at selected intervals of time.

In accordance with a preferred embodiment of the invention, the values and types of various components illustrated in FIG. 1 are found in Table 1.

TABLE 1

| Component | Component Value or Type |
|---|---|
| Transformer 26 | EW-55 |
| Resistor 34 | 20 kilohms |
| Resistor 40 | 200 ohms |
| Resistor 44 | 4.7 kilohms |
| Resistor 56 | 5.1 kilohms |
| Capacitor 36 | 0.0047 microfarad |
| Capacitor 42 | 0.33 microfarad |
| Capacitor 46 | 0.015 mocrofarad |
| Capacitor 54 | 2.2 microfarad |
| Transistor 38 | Type 2N3638 |
| B+ Voltage Supply Source | +12 volts, direct current |

Although the invention has been shown in connection with preferred embodiments, it will be readily apparent to those skilled in the art that various changes in form and arrangement of parts may be made to suit requirements without departing from the spirit and scope of the invention.

Having thus described my invention, I claim:

1. A measuring device for measuring the absorption of energy by a rotatable metallic object irregular with respect to its axis of rotation and comprising:

oscillator means for generating energy in the form of an oscillating signal;

a cylindrical ferrite rod for concentrating a variable magnetic flux for directing energy toward a metallic object, said rod being positioned in proximity to said metallic object;

a coil of wire positioned around said rod and coupled to said oscillator means, for upon energization by said oscillator means, transmitting the energy to said rod to thereby induce a magnetic flux within said rod variable with position of said object;

detection means coupled to said oscillator means for providing an output signal having a value representative of the value of the oscillating signal developed by the oscillator means, wherein the oscillating signal is responsive to variation in the absorption of energy by a metallic object so that the output signal provides an indication of variations in the amount of energy absorbed by said metallic object, said detection means including input circuit means for receiving said oscillating signal and rectifier circuit means for converting said oscillating signal to a direct-current voltage signal having a value representative of the amplitude of said oscillating signal; and indicator means coupled to said rectifier circuit means of said detection means for providing a visual indication representative of the value of said direct-current voltage signal developed by said detection means to thereby provide a visual indication of the amount of energy absorbed by said metallic object;

said oscillator means including electronic control means having input and output circuit means, and a transformer having a primary, secondary, and feedback winding;

said primary winding of said transformer being coupled to said output circuit means of said electronic control means, said feedback winding of said transformer being coupled to said input circuit means of said electronic control means, and said secondary winding of said transformer being coupled to said coil of wire positioned around said ferrite rod.

2. A measuring device for measuring the velocity of rotation of a metallic object about an axis of rotation and comprising:

oscillator means for generating energy in the form of an oscillating signal;

a cylindrical ferrite rod for concentrating magnetic flux for directing energy toward said metallic object, said rod being positioned in proximity to said metallic object;

a coil of wire positioned around said rod and coupled to said oscillator means, for upon energization by said oscillator means, transmitting energy to said rod to thereby induce magnetic flux within said rod;

demodulating means coupled to said oscillator means for providing an output signal having a value representative of the value of modulations of the oscillating signal, said modulations being caused by variations in the amount of energy absorbed by a said metallic object when a said metallic object is rotated about its axis;

frequency converter means coupled to the demodulating means for converting the output signal developed by said demodulating means to a direct-current voltage signal having a magnitude representative of the value of the output signal; and a velocity readout indicator coupled to said frequency converter means for providing a visual indication representative of the magnitude of said direct-current signal developed by said frequency converter means to thereby provide a visual indication representative of the velocity of rotation of a said metallic object;

said oscillator means including electronic control means having input and output circuit means, and a transformer having a primary, secondary, and feedback windings;

said primary winding of said transformer being coupled to said output circuit means of said electronic control means, said feedback winding of said transformer being coupled to said input circuit means of said electronic control means, and said secondary winding of said transformer being coupled to said coil of wire positioned around said ferrite rod.